(12) United States Patent
Chen et al.

(10) Patent No.: US 8,367,253 B2
(45) Date of Patent: Feb. 5, 2013

(54) LITHIUM-ION BATTERIES WITH INTRINSIC PULSE OVERCHARGE PROTECTION

(75) Inventors: Zonghai Chen, Downers Grove, IL (US); Khalil Amine, Downers Grove, IL (US)

(73) Assignee: U Chicago Argonne LLC, Chicago, IL (US)

( * ) Notice: Subject to any disclaimer, the term of this patent is extended or adjusted under 35 U.S.C. 154(b) by 2280 days.

(21) Appl. No.: 11/345,947

(22) Filed: Feb. 2, 2006

(65) Prior Publication Data

US 2007/0178370 A1    Aug. 2, 2007

(51) Int. Cl.
*H01M 6/16*    (2006.01)
*H01M 4/13*    (2010.01)

(52) U.S. Cl. .................................. 429/326; 429/231.1

(58) Field of Classification Search .......... 429/122–347; 29/623.1–623.5
See application file for complete search history.

(56) References Cited

U.S. PATENT DOCUMENTS

| | | | |
|---|---|---|---|
| 4,201,839 A * | 5/1980 | Johnson et al. ............... | 429/337 |
| 4,513,143 A | 4/1985 | Ng et al. | |
| 4,857,423 A | 8/1989 | Abraham et al. | |
| 5,487,959 A | 1/1996 | Koksbang | |
| 5,709,968 A | 1/1998 | Shimizu | |
| 5,731,106 A | 3/1998 | Tsutsumi et al. | |
| 5,763,119 A | 6/1998 | Adachi | |
| 5,824,434 A | 10/1998 | Kawakami et al. | |
| 5,849,432 A | 12/1998 | Angell et al. | |
| 5,858,573 A | 1/1999 | Abraham et al. | |
| 6,004,698 A | 12/1999 | Richardson et al. | |
| 6,045,952 A | 4/2000 | Kerr et al. | |
| 6,074,777 A | 6/2000 | Reimers et al. | |
| 6,207,326 B1 | 3/2001 | Kawakami et al. | |
| 6,232,021 B1 | 5/2001 | Negoro | |
| 6,291,107 B1 | 9/2001 | Shimizu | |
| 6,387,571 B1 | 5/2002 | Lain et al. | |
| 6,506,516 B1 | 1/2003 | Wietelmann et al. | |
| 6,780,545 B2 | 8/2004 | Birke-Salam et al. | |
| 2002/0039687 A1 | 4/2002 | Barker et al. | |
| 2002/0164528 A1 * | 11/2002 | Sunagawa et al. ......... | 429/231.3 |

(Continued)

FOREIGN PATENT DOCUMENTS

| JP | 1975-000095 | 1/1975 |
|---|---|---|
| TW | 222234 B * | 10/2004 |

OTHER PUBLICATIONS

International Search Report for PCT Application No. PCT/US06/08664, dated Dec. 13, 2006.

(Continued)

*Primary Examiner* — Basia Ridley
*Assistant Examiner* — Jonathan G Leong
(74) *Attorney, Agent, or Firm* — Foley & Lardner LLP

(57) ABSTRACT

The present invention relates in general to the field of lithium rechargeable batteries, and more particularly relates to the positive electrode design of lithium-ion batteries with improved high-rate pulse overcharge protection. Thus the present invention provides electrochemical devices containing a cathode comprising at least one primary positive material and at least one secondary positive material; an anode; and a non-aqueous electrolyte comprising a redox shuttle additive; wherein the redox potential of the redox shuttle additive is greater than the redox potential of the primary positive material; the redox potential of the redox shuttle additive is lower than the redox potential of the secondary positive material; and the redox shuttle additive is stable at least up to the redox potential of the secondary positive material.

24 Claims, 4 Drawing Sheets

U.S. PATENT DOCUMENTS

| | | | |
|---|---|---|---|
| 2003/0091892 | A1 | 5/2003 | Watanabe et al. |
| 2003/0118912 | A1 | 6/2003 | Watanabe et al. |
| 2003/0180615 | A1 | 9/2003 | Johnson et al. |
| 2003/0190529 | A1 | 10/2003 | Kim et al. |
| 2004/0013944 | A1 | 1/2004 | Lee et al. |
| 2004/0028996 | A1 | 2/2004 | Hamamoto et al. |
| 2004/0029017 | A1 | 2/2004 | Besenhard et al. |
| 2004/0121239 | A1 | 6/2004 | Abe et al. |
| 2004/0131934 | A1 | 7/2004 | Sugnaux et al. |
| 2004/0157126 | A1 | 8/2004 | Belharouak et al. |
| 2004/0191633 | A1 | 9/2004 | Johnson et al. |
| 2004/0214091 | A1 | 10/2004 | Lim et al. |
| 2005/0019670 | A1 | 1/2005 | Amine et al. |
| 2005/0058588 | A1 | 3/2005 | Kang et al. |
| 2005/0079419 | A1* | 4/2005 | Jan et al. .................. 429/231.95 |
| 2005/0106470 | A1 | 5/2005 | Yoon et al. |
| 2005/0221196 | A1 | 10/2005 | Dahn et al. |
| 2005/0227143 | A1 | 10/2005 | Amine et al. |

OTHER PUBLICATIONS

Yoshio, M. et al., "Storage and cycling performance of Cr-modified spinel at elevated temperatures," *Journal of Power Sources*, vol. 101, pp. 79-85, Aug. 29, 2001; published by Elsevier Science B.V.

Ravet, N. et al., "Electroactivity of natural and synthetic triphylite," *Journal of Power Sources*, vols. 97-98, pp. 503-507, Jul. 3, 2001; published by Elsevier Science B.V.

Davidson, I. J. et al., "Rechargeable cathodes based on $Li_2CR_xMn_{2-x}O_4$," *Journal of Power Sources*, vol. 54, pp. 205-208, 1995; published by Elsevier Science B.V.

Andersson, A. S. et al., "Lithium extraction/insertion in $LiFePO_4$: an X-ray diffraction and Mössbauer spectroscopy study," *Solid State Ionics*, vol. 130, pp. 41-52, Apr. 28, 2000; published by Elsevier Science B.V.

Xu, K. et al., "Lithium Bis(oxalate)borate Stabilizes Graphite Anode in Propylene Carbonate," *Electrochemical and Solid-State Letters*, vol. 5, No. 11, pp. A259-A262, 2002; published by The Electrochemical Society, Inc. Available electronically Sep. 10, 2002.

Kannan, A. M. et al., "Surface/Chemically Modified $LiMn_2O_4$ Cathodes for Lithium-Ion Batteries," *Electrochemical and Solid-State Letters*, vol. 5, No. 7, pp. A167-A169, 2002; published by The Electrochemical Society, Inc. Available electronically May 3, 2002.

Huang, H. et al., "Approaching Theoretical Capacity of $LiFePO_4$ at Room Temperature at High Rates," *Electrochemical and Solid-State Letters*, vol. 4, No. 10, pp. A170-A172, 2001; published by The Electrochemical Society, Inc. Available electronically Aug. 20, 2001.

Blyr, A. et al., "Self-Discharge of $LiMn_2O_4$/C Li-Ion Cells in Their Discharged State," vol. 145, No. 1, pp.194-209, Jan. 1998; published by The Electrochemical Society, Inc.

Chen, Z. et al., "Reducing Carbon in $LiFePO_4$/C Composite Electrodes to Maximize Specific Energy, Volumetric Energy, and Tap Density," *J. Electrochem. Soc.*, vol. 149, No. 9, pp. A1184-A1189, 2002; published by The Electrochemical Society, Inc. Available electronically Jul. 29, 2002.

Yamada, A. et al., "Optimized $LiFePO_4$ for Lithium Battery Cathodes," *J. Electrochem. Soc.*, vol. 148, No. 3, pp. A224-A229, 2001; published by The Electrochemical Society, Inc.

Franger, S. et al., "Optimized Lithium Iron Phosphate for High-Rate Electrochemical Applications," *J. Electrochem. Soc.*, vol. 151, vol. 7, pp. A1024-A1027, 2004; published by The Electrochemical Society, Inc. Available electronically May 27, 2004.

Chung, S.-Y. et al., "Electronically conductive phospho-olivines as lithium storage electrodes," *Nature Materials*, vol. 1, pp. 123-128, Oct. 2002; published by Nature Publishing Group. Published online Sep. 22, 2002.

Padhi, A. K. et al., "Phospho-olivines as Positive-Electrode Materials for Rechargeable Lithium Batteries," *J. Electrochem. Soc.*, vol. 144, No. 4, Apr. 1997; published by the Electrochemical Society, Inc.

Amatucci, G. G. et al., "Failure Mechanism and Improvement of the Elevated Temperature Cycling of $LiMn_2O_4$ Compounds Through the Use of the $LiAl_xMn_{2-x}O_{4-z}F_z$ Solid Solution," *J. Electrochem. Soc.*, vol. 148, No. 2, pp. A171-A182, 2001; published by The Electrochemical Society, Inc.

Sigala, C. et al., "Influence of the Cr Content on the Electrochemical Behavior of the $LiCr_yMn_{2-y}O_4$ ($0 \leqq y \leqq 1$) Compounds," *J. Electrochem. Soc.*, vol. 148, No. 8, pp. A826-A832, 2001; published by The Electrochemical Society, Inc. Available electronically Jun. 25, 2001.

Kellomäki, M. et al., "Processing and properties of two different poly (ortho esters)," *Journal of Materials Science; Materials in Medicine*, vol. 11, pp. 345-355, 2000; published by Kluwer Academic Publishers.

Lee, H. S. et al., "Synthesis of a Series of Fluorinated Boronate Compounds and Their Use as Additives in Lithium Battery Electrolytes," *J. Electrochem. Soc.*, vol. 151, No. 9, pp. A1429-A1435, 2004; published by The Electrochemical Society, Inc.

Chen, J. et al., "Chemical Overcharge and Overdischarge Protection for Lithium-Ion Batteries," *Electrochemical and Solid-State Letters*, vol. 8, No. 1, pp. A59-A62, 2005; published by The Electrochemical Society, Inc.

Komaba, S. et al., "2-Vinylpyridine as Film-forming Additve [sic] to Suppress the Degradation of Carbon Anode by Dissolved Manganese for $E/LiMn2O4$ Rechargable Battery," Chemistry Letters, 2002, No. 12, pp. 1236-1237; published by The Chemical Society of Japan.

International Search Report for PCT/US06/62171, mailed Mar. 31, 2008.

Ying, J. et al., "Preparation and characterization of high-density spherical $LiNi_{0.8}Co_{0.2}O_2$ cathode material for lithium secondary batteries," *Journal of Power Sources*, vol. 99, pp. 78-84, 2001; published by Elsevier Science B.V.

Lee, M.-H. et al., "Synthetic optimization of $Li[Ni_{1/3}Co_{1/3}Mn_{1/3}]O_2$ via co-precipitation," *Electrochimica Acta*, vol. 50, pp. 939-948, 2004; published by Elsevier Ltd.

Lee, Y. S. et al., "Preparation and characterization of nano-crystalline $LiNi_{0.5}Mn_{1.5}O_4$ for 5 V cathode material by composite carbonate process," *Electrochemistry Communications*, vol. 4, pp. 989-994, 2002; published by Elsevier Science B.V.

Park, K. S. et al., "Synthesis of $LiFePO_4$ with fine particle by co-precipitation method," *Materials Research Bulletin*, vol. 39, pp. 1803-1810, 2004; published by Elsevier Ltd.

Park, S.-M. et al., "Novel Synthesis Method for Preparing Layered $Li[Mn_{1/2}Ni_{1/2}]O_2$ as a Cathode Material for Lithium Ion Secondary Battery," *Chemistry Letters*, vol. 33, No. 6, pp. 748-749, 2004; published by The Chemical Society of Japan.

Park, S.-H. et al., "Synthesis of Nanostructured $Li[Ni_{1/3}Co_{1/3}Mn_{1/3}]O_2$ via a Modified Carbonate Process," *Chem. Mater.*, vol. 17, pp. 608, 2005; published by American Chemical Society.

Cho, Tae-hyung et al., "Preparation of Layered $Li[Ni_{1/3}Mn_{1/3}Co_{1/3}]O_2$ as a Cathode for Lithium Secondary Battery by Carbonate Coprecipitation Method," *Chemistry Letters*, vol. 33, No. 6, pp. 704-705, 2004; published in The Chemical Society of Japan.

\* cited by examiner

LITHIUM-ION BATTERIES WITH INTRINSIC PULSE OVERCHARGE PROTECTION

GOVERNMENT INTERESTS

This invention was made with Government support under Contract No. W-31-109-ENG-38 awarded by the Department of Energy. The Government has certain rights in this invention.

FIELD OF THE INVENTION

This present invention relates in general to the field of lithium rechargeable batteries, and more particularly relates to the positive electrode design of lithium-ion batteries with improved high-rate pulse overcharge protection.

BACKGROUND OF THE INVENTION

Currently, many consumer electronics are powered by lithium-ion batteries, the safety of which is a big concern to both the consumers and the manufacturers. A reliable battery must survive several abuse conditions, including overcharge. Overcharge generally occurs when a current is forced through a lithium-ion battery and the charge delivered exceeds the charge-storing capability of the battery. Overcharge of lithium-ion batteries can trigger chemical and electrochemical reactions of battery components, rapid temperature elevation, and can even trigger self-accelerating reactions leading up to, and including, explosion of the battery.

In current lithium-ion battery technology, several overcharge protection mechanisms are typically added to ensure the safety of the batteries during overcharging conditions. For instance, a chemical compound known as a redox shuttle additive may be incorporated into the battery electrolyte to provide intrinsic overcharge protection. Generally, the redox shuttle can be reversibly electrochemically oxidized and reduced at a potential slightly higher than the working potential of the positive electrode of the battery. With the incorporation of a redox shuttle into the electrolyte, lithium-ion batteries can normally operate in a voltage range below the redox potential of the redox shuttle. If the battery is overcharged, the battery voltage will meet the redox potential of the additive first and activate the redox mechanism of the redox shuttle. In general, when the overcharge current is lower than the shuttle capability of the additive, the redox shuttle will be the only active component to transfer the excessive charge through the battery without causing any damage to the battery. Under such mechanisms, the dangerous voltage of the battery is never reached even if the battery is overcharged.

While redox shuttles provide some protection of a lithium-ion battery, no redox shuttle can provide unlimited overcharge protection. The main barrier is the maximum shuttle current the redox shuttle can provide, which determines the maximum overcharge current that a battery with a redox shuttle, can sustain. The maximum shuttle current is physically limited by the solubility of the redox shuttle in non-aqueous electrolytes, the diffusion coefficient of the redox shuttle in the non-aqueous electrolytes, the charge transfer constant of the redox shuttle on the electrode surface, and battery geometry. Generally, redox shuttles described in the literature have very limited solubility in the non-aqueous electrolytes, and can only provide low rate overcharge protection. Once the overcharge current exceeds the maximum shuttle current of the redox shuttle, the battery will be driven to higher voltages that trigger dangerous reactions in the battery.

Recently, lithium-ion batteries have been proposed as the power source for hybrid electric vehicles (HEV). During braking of a HEV, the excessive energy from the engine is stored in the lithium-ion battery. A high-rate pulse current, which can be up to a 10 C rate, will be forced through the battery to meet the high power output of the engine. In this situation, those lithium-ion cells already at their maximum charge capacity will be overcharged with a very high current (up to 10 C). It remains a huge challenge to design a redox shuttle to provide such high shuttle current. Because state-of-the-art redox shuttles alone cannot provide such high rate continuous overcharge protection, there remains a need in the art to meet the challenge of high rate pulse overcharge can for lithium-ion batteries.

SUMMARY OF THE INVENTION

In one aspect, the present invention provides a new design of positive electrodes for lithium-ion batteries that dramatically boosts the pulse overcharge protection capability of the redox shuttle added to the batteries. More specifically, the present design allocates a small portion of capacity in the cathode beyond the redox potential of the redox shuttle. The extra capacity will not be accessed during normal battery operation and low-rate overcharge, but acts as the charge buffer to store the extra charge that cannot be handled by the redox shuttle during a pulse. In further aspects there are provided methods of making and using batteries using such overcharge protection systems.

DETAILED DESCRIPTION

Figure 1:
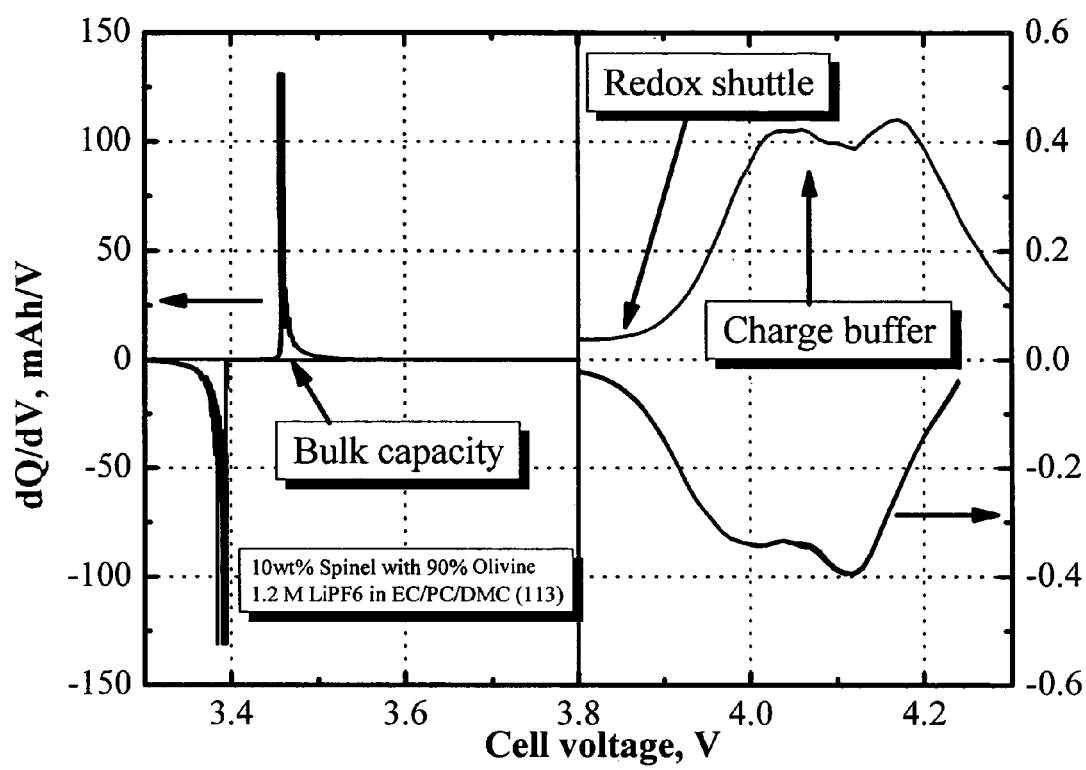
FIG. 1 is a graph of the differential capacity profile of a half-cell containing a blended positive electrode comprising $LiFePO_4$ and $LiMn_2O_4$.

The present invention relates to the design of cathode electrodes to enhance the pulse overcharge protection of redox shuttles for lithium-ion batteries. More generally, it is related to the design of lithium-ion batteries incorporating redox shuttles that are tolerant to high-rate pulse overcharge. Lithium-ion batteries containing electrodes and electrolytes of the present invention, may be used in applications such as the hybrid electric vehicles (HEV) and other high-power battery applications.

Generally, a successful redox shuttle is required to have a redox potential 0.2-0.3 V higher than the working potential of the positive electrode of a lithium-ion battery. This will minimize the self-discharge of the battery induced by the shuttle mechanism of the redox shuttle. This design is generally applicable to high-energy lithium-ion batteries that are subjected to charging and discharging at low-rate currents. The redox shuttle, incorporated in the battery, is enough to handle the low rate current, and the potential of the positive electrode will never go beyond the redox potential of the redox shuttle. Therefore, at low-rate charging and discharging currents, any capacity residues at potentials higher than the redox potential will never be exploited and are considered to be inactive material.

However, the design described above is significantly challenged for high-power lithium-ion batteries. In general cases, the current for power applications is beyond the physical limitations of a redox shuttle. Once the battery is overcharged, the potential of the positive electrode will dynamically be driven to a potential higher than the redox potential of the redox shuttle, and this effect increases dramatically with the current applied. The design of the present invention is to incorporate a charge buffer in the positive electrode to improve the pulse-overcharge tolerance of the battery. The charge buffer of the present invention may be any positive electrode material that can deliver extra capacity at a potential range higher than the redox potential of the redox shuttle. When a low-rate current is applied, the redox shuttle can work properly and keep the cell potential under the redox potential of the redox shuttle. In this case, the charge buffer will not be activated. When a high-rate pulse current is applied beyond the capability of the redox shuttle, the capacity of the charge buffer will be accessed. During pulse overcharging, the charge buffer will be charged and will store the extra charge that cannot be shuttled by the redox shuttle. When the pulse is over, the charge buffer will be discharged with the aid of the redox shuttle through self-discharge and an empty charge buffer is then regenerated for next pulse overcharge. With the special design of the charge buffer, the pulse overcharge protection of the battery can be significantly improved, regardless of the charge carrying capability of the redox shuttle.

In accordance with one aspect of the present invention, there are provided electrochemical devices that include a cathode comprising at least one primary positive material and at least one secondary positive material (i.e., the charge buffer), an anode, and a non-aqueous electrolyte comprising a redox shuttle additive. The redox shuttle has a redox potential that is greater than the redox potential of the primary positive material, but less than the redox potential of the secondary positive material. The redox shuttle additive is also stable at least up to the redox potential of the secondary positive material. By "stable" it is meant that the redox shuttle additive does not decompose at the working potential or overcharge potential of the device, and does not decompose to or otherwise form a passivation film on either the cathode or the anode.

Redox shuttle additives of the present invention, capable of being oxidized and reduced in the non-aqueous electrolyte, may typically be either a substituted or unsubstituted ferrocene compound, such as those described in U.S. Pat. No. 4,857,423, or a substituted aromatic compound. The substituted aromatic compounds suitable for use in the present invention may generally be of formula I:

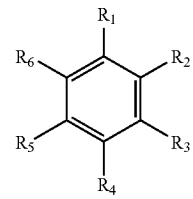

$R_1$, $R_2$, $R_3$, $R_4$, $R_5$ and $R_6$ of Formula I may each independently be selected from H, —F, —Cl, —Br, —I, haloalkyl, cycloalkyl, alkyl, alkenyl, aryl, heteroaryl, —CN, or —NO$_2$, —O-alkyl, —O-aryl, —O-heteroaryl, —O-alkenyl, —O-alkynyl, —S-alkyl, —S-aryl, —S-alkenyl, —S-alkynyl, —S-heteroaryl, and the groups:

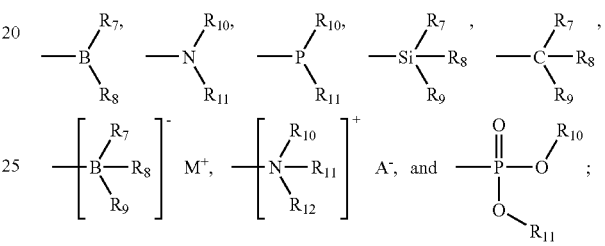

or any two adjacent groups of $R_1$, $R_2$, $R_3$, $R_4$, $R_5$ and $R_6$ together may form a fused aryl or heteroaryl ring; and where each $R_7$, $R_8$ and $R_9$ may independently be a hydrogen, halogen, an alkyl group, an aryl group, a halogen substituted alkyl group, or a halogen substituted aryl group; and where each $R_{10}$, $R_{11}$ and $R_{12}$ may independently be a halogen atom, an alkyl group, an aryl group, a halogen substituted alkyl group, or a halogen substituted aryl group; where $M^+$ is a cation, $A^-$ is an anion, and where at least one of $R_1$, $R_2$, $R_3$, $R_4$, $R_5$ and $R_6$ is not H. Also, two or more of $R_1$, $R_2$, $R_3$, $R_4$, $R_5$ and $R_6$ may each independently be an —O-alkyl, —O-alkenyl, —O-alkynyl, —O-aryl, or —O-heteroaryl group. In some embodiments, $R_1$ is H. In other embodiments, the redox shuttle additive may be 2,5-di-(tert-butyl)-1,4-dimethoxybenzene, (tetrafluorobenzo-1,2-dioxyl)-pentafluorophenyl-borane, or a mixture thereof. In another embodiment, the redox shuttle additive is a borate or heteroborate cluster ion, e.g., $Li_2B_{10}X_{10}$ or $Li_2B_{12}X_{12}$ where each X is independently selected from the group consisting of H, F, Cl, Br, I, OCH$_3$, and OH. Borate and heteroborate salts suitable for use in the present invention include $Li_2B_{10}Cl_{10}$, $Li_2B_{10}OH_{3-5}Cl_{5-9}$, $Li_2B_{10}H_2Cl_8$, $Li_2B_{10}Cl_8(OH)_2$, $Li_2B_{10}Br_{10}$, $Li_2B_{12}Cl_{12}$, and those described in U.S. Patent Publication No. 2005/0227143. The redox shuttle additives of the present invention may be a mixture of any two or more of the materials identified above as redox shuttle additives.

In other embodiments of the present invention, the concentration of the redox shuttle additive ranges from about 0.0005 weight percent (wt %) to about 50 wt %, and more typically from about 0.0005 wt % to about 10 wt %. In some cases, where $Li_2B_{10}X_{10}$ or $Li_2B_{12}X_{12}$ (each X is independently selected from the group consisting of H, F, Cl, Br, I, OCH$_3$, and OH) are employed, they can also be used as the alkali metal salt of the electrolyte. The concentration of such borate/heteroborate salts ranges from 0.01 M to 0.6 M, preferably from 0.1 M to 0.5 M, more preferably from 0.3 M to 0.4 M.

In other embodiments of the present invention, the redox shuttle additive has a redox potential v. $Li^0$ of from about 3.0V to about 5.0V, in other embodiments from about 3.6V to about 4.8V, and in yet other embodiments from about 4.2V and about 4.4V.

Electrolytes of the invention include an alkali metal salt dissolved in a polar aprotic solvent and are non-aqueous—i.e., contain either no water, or almost no water (e.g., ≦100 ppm water). The alkali metal salt is typically present at a concentration of from about 0.5 to about 2 molar, and is typically a lithium salt. Exemplary lithium salts include Li[B(C$_2$O$_4$)$_2$], Li[BF$_2$(C$_2$O$_4$)], Li[PF$_2$(C$_2$O$_4$)$_2$], LiClO$_4$, LiBF$_4$, LiAsF$_6$, LiPF$_6$, LiCF$_3$SO$_3$, Li[N(CF$_3$SO$_2$)$_2$], Li[C(CF$_3$SO$_2$)$_3$], Li[N(SO$_2$C$_2$F$_5$)$_2$], Li$_2$B$_{10}$X$_{10}$ or Li$_2$B$_{12}$X$_{12}$ where each X is independently selected from the group consisting of H, F, Cl, Br, I, OCH$_3$, and OH, lithium alkyl fluorophosphates, or a mixture of any two or more thereof. Lithium decaborates (Li$_2$B$_{10}$X$_{10}$) and lithium dodecaborates (Li$_2$B$_{12}$X$_{12}$) may be used as either the alkali metal salt in the electrolyte, or as the redox shuttle additive of the device, or in the dual role as both.

Suitable polar aprotic solvents for use in non-aqueous electrolytes are known in the art and include, for example, ethyl acetate, propyl acetate, ethylene carbonate, propylene carbonate, dimethyl carbonate, diethyl carbonate, ethyl methyl carbonate, dimethyl ether, diethyl ether, methyl acetate, gamma-butyrolactone, sulfolane, or a mixture of any two or more thereof. Protic solvents such as water and alcohols cannot be used with the present invention.

Cathodes of the invention comprise primary and secondary positive material that may be the same or different. In some embodiments, the positive electrode is a blend of two or more different positive electrode materials. At least one of the materials is the primary material that works properly below the redox potential of the redox shuttle, and at least one of the materials is added as the charge buffer. In certain cases, positive electrode materials can act as both the primary material and as the charge buffer, particularly in cases where the material exhibits different voltage potentials at zero charge and at full charge. In some such embodiments the positive material can be LiMn$_{1-x''-y''}$Ni$_{x''}$Co$_{y''}$O$_2$, wherein 0≦x''≦1, 0≦y''≦1, 0≦x''+y''≦1. For instance, LiMn$_{1/3}$Ni$_{1/3}$Co$_{1/3}$O$_2$ with 10% excess lithium delivers capacity in a wide potential range from about 3.7 V to about 4.6 V vs. Li. Therefore, any positive electrodes containing materials such as LiMn$_{1/3}$Ni$_{1/3}$Co$_{1/3}$O$_2$ with 10% excess lithium may fulfill the design described in the present invention.

Cathodes in devices of the present invention may have a primary positive material that is a lithium metal oxide cathode or a mixture of two or more lithium metal oxide cathodes and a secondary positive material that is a lithium metal oxide cathode or a mixture of two or more lithium metal oxide cathodes. In some embodiments of the present invention, the primary positive material may be LiFePO$_4$. In other embodiments, the secondary positive material is spinel, LiMn$_2$O$_4$, LiCoO$_2$, LiCo$_{1-\alpha'}$Al$_{\alpha'}$O$_2$, or LiMn$_{1-x''-y''}$Ni$_{x''}$Co$_{y''}$O$_2$, wherein 0≦α'≦0.2, 0≦x''≦1, 0≦y''≦1, 0≦x''+y''≦1.

The cathode in an invention electrochemical device may have a primary positive material selected from a group comprising Li$_2$S, spinel, olivine, carbon-coated olivine, LiFePO$_4$, LiCoO$_2$, LiNiO$_2$, LiNi$_{1-x}$Co$_y$Met$_z$O$_2$, LiMn$_{0.5}$Ni$_{0.5}$O$_2$, LiMn$_{0.3}$Co$_{0.3}$Ni$_{0.3}$O$_2$, LiMn$_2$O$_4$, LiFeO$_2$, LiMet$_{0.5}$Mn$_{1.5}$O$_4$, Li$_{1+x}$Ni$_\alpha$Mn$_\beta$Co$_\gamma$Met'$_\delta$O$_{2-z'}$Y'$_{z'}$, A$_n$B'$_2$(XO$_4$)$_3$ (NASICON), Li$_{1+x}$Mn$_{2-x}$O$_4$, or mixtures of any two or more thereof, where Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B' is Ti, V, Cr, Fe, or Zr; X is P, S, Si, W, or Mo; Y' is F or S and 0≦x≦0.3, 0≦y≦0.5, 0≦z≦0.5, and 0≦x'≦0.4, 0≦α≦1, 0≦β≦1, 0≦γ≦1, 0≦δ≦0.4, and 0≦z'≦0.4; and 0≦n'≦3. In other embodiments, the primary positive material may be a spinel manganese oxide of formula Li$_{1+x}$Mn$_{2-z}$Met$_y$O$_{4-m}$X$_n$, where Met is Al, Mg, Ti, B, Ga, Si, Ni, or Co; X is S or F; and where 0≦x≦0.3, 0≦y≦0.5, 0≦z≦0.5, 0≦m≦0.5 and 0≦n≦0.5, or a olivine of formula LiFe$_{1-z}$Met''$_y$PO$_{4-m}$X$_n$, where Met'' is Al, Mg, Ti, B, Ga, Si, Ni, Mn or Co; X is S or F; and wherein 0≦y≦0.5, 0≦z≦0.5, 0≦m≦0.5 and 0≦n≦0.5. In yet other embodiments, the primary positive material is Li$_{1+x}$Mn$_{2-z}$Met$_y$O$_{4-m}$X$_n$, LiFe$_{1-z}$Met$_y$PO$_{4-m}$X$_n$, or mixtures of any two or more thereof, wherein Met is Al, Mg, Ti, B, Ga, Si, Ni, or Co; X is S or F; and wherein 0≦x≦0.3, 0≦y≦0.5, 0≦z≦0.5, 0≦m≦0.5, and 0≦n≦0.5.

Primary positive materials of the invention may be surface coated to minimize degradation of the cathode under normal operating conditions. For example, spinel or olivine particles may be surface coated with a material that can neutralize acid or otherwise lessen or prevent leaching of the manganese or iron ions. Thus, inventive cathodes may comprise a surface coating of a metal oxide on the spinel or olivine particles such as ZrO$_2$, TiO$_2$, ZnO$_2$, WO$_3$, Al$_2$O$_3$, MgO, SiO$_2$, SnO$_2$ AlPO$_4$, Al(OH)$_3$, a mixture of any two or more thereof, or any other suitable metal oxide. The coating can also be applied to a carbon-coated olivine. Where carbon-coated olivine is used, the metal oxide coating can be applied to the carbon-coated olivine or it can be applied to the olivine followed by carbon coating of the metal oxide film.

In some embodiments the secondary positive material is spinel, olivine, carbon-coated olivine, LiFePO$_4$, LiCoO$_2$, LiNiO$_2$, LiNi$_{1-x}$Co$_y$Met$_z$O$_2$, LiMn$_{0.5}$Ni$_{0.5}$O$_2$, LiMn$_{0.3}$Co$_{0.3}$Ni$_{0.3}$O$_2$, LiMn$_2$O$_4$, LiFeO$_2$, LiMet$_{0.5}$Mn$_{1.5}$O$_4$, Li$_{1+x}$Ni$_\alpha$Mn$_\beta$Co$_\gamma$Met'$_\delta$O$_{2-z'}$Y'$_{z'}$, A$_n$B'$_2$(XO$_4$)$_3$, or mixtures of any two or more thereof, wherein Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, and Zn; B' is Ti, V, Cr, Fe, and Zr; X is P, S, Si, W, Mo; Y' is F or S; 0≦x≦0.3, 0≦y≦0.5, 0≦z≦0.5, 0≦x'≦0.4, 0≦α≦1, 0≦β≦1, 0≦γ≦1, 0≦δ≦0.4, and 0≦z'≦0.4; and 0≦n'≦3. In other embodiments, the secondary positive material may be a spinel manganese oxide with the formula of Li$_{1+x}$Mn$_{2-z}$Met$_y$O$_{4-m}$X$_n$, wherein Met is Al, Mg, Ti, B, Ga, Si, Ni, or Co; X is S or F; and wherein 0≦x≦0.3, 0≦y≦0.5, 0≦z≦0.5, 0≦m≦0.5 and 0≦n≦0.5, or the cathode may comprise olivine with a formula of LiFe$_{1-z}$Met''$_y$PO$_{4-m}$X$_n$, wherein Met'' is Al, Mg, Ti, B, Ga, Si, Ni, Mn or Co; X is S or F; and wherein 0≦y≦0.5, 0≦z≦0.5, 0≦m≦0.5 and 0≦n≦0.5. In other embodiments, the secondary positive material may be LiMn$_{1-x''-y''}$Ni$_{x''}$Co$_{y''}$O$_2$, wherein 0≦x''≦1, 0≦y''≦1, 0≦x''+y''≦1.

In a manner analogous to the stabilization of the primary positive electrode material, the secondary positive electrode material may also be stabilized by surface coating the spinel or olivine with a protective metal oxide coating. For example, the secondary positive material may comprise a surface coating of a metal oxide on the spinel or olivine particles such as ZrO$_2$, TiO$_2$, ZnO$_2$, WO$_3$, Al$_2$O$_3$, MgO, SiO$_2$, SnO$_2$ AlPO$_4$, Al(OH)$_3$, a mixture of any two or more thereof, or any other suitable metal oxide. The coating may also be applied to a carbon-coated olivine. Where carbon-coated olivine is used, the metal oxide coating may be applied to the carbon-coated olivine or may be applied to the olivine first followed by carbon coating of the metal oxide film. Methods for coating spinel cathodes with metal oxides are disclosed in U.S. Patent Application No. 2004/0191633 A1 and may readily be adapted for use with olivine cathodes.

Table 1, illustrative of the present invention, shows non-limiting examples of combinations of primary positive and secondary positive materials and various redox shuttle additives that may be appropriate for the chosen pair(s) of positive materials. Table 1 is by no means an exhaustive listing of combinations, but particularly illustrates the relationship between the redox potentials of the three types of components. Thus for example, the redox potential of the secondary positive material can range from about 0.01 to about 1 V higher than the redox potential of the primary positive material. In some embodiments the difference between the primary and secondary materials ranges from about 0.2 to about 0.4, 0.6 or 0.8 V. In still other embodiments, the redox potential difference ranges from about 0.4 to about 0.6 or 0.8 V.

TABLE 1

Examples of Primary/Secondary positive material and redox shuttle pairs

| No. | Primary positive material | Secondary positive material | Redox shuttle |
|---|---|---|---|
| 1 | LiFePO$_4$ (3.5 V vs. Li$^0$) | Li$_{1+x}$Mn$_{2-x}$O$_4$ (3.9-4.2 V vs. Li$^0$) [$0 \leq x \leq 0.30$] | 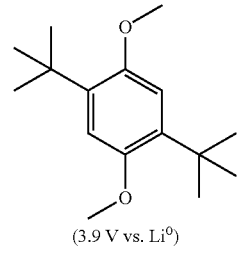 (3.9 V vs. Li$^0$) |
| 2 | Carbon-coated LiFePO$_4$ (3.5 V vs. Li$^0$) | Li$_{1+x}$Mn$_{2-x}$O$_4$ (3.9-4.2 V vs. Li$^0$) [$0 \leq x \leq 0.30$] | 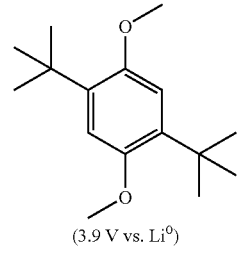 (3.9 V vs. Li$^0$) |
| 3 | LiFePO$_4$ (3.5 V vs. Li$^0$) | LiCoO$_2$ (3.95-4.7 V vs. Li$^0$) | 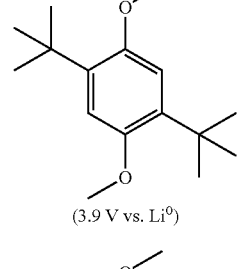 (3.9 V vs. Li$^0$) |
| 4 | LiFePO$_4$ (3.5 V vs. Li$^0$) | LiMn$_{1-x''-y''}$Ni$_{x''}$Co$_{y''}$O$_2$ With or without excess lithium (3.7-4.8 V vs. Li$^0$) [$0 \leq x'' \leq 1; 0 \leq y'' \leq 1; 0 \leq x'' + y'' \leq 1$] | 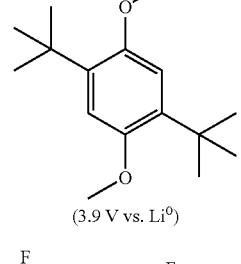 (3.9 V vs. Li$^0$) |
| 5 | Li$_{1+x}$Mn$_{2-x}$O$_4$ (3.9-4.2 V vs. Li$^0$) [$0 \leq x \leq 0.30$] | LiCoO$_2$ (3.95-4.7 V vs. Li$^0$) | 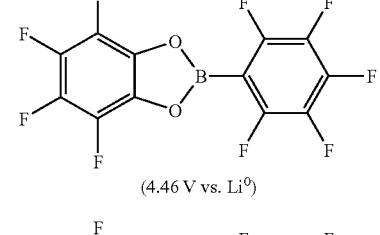 (4.46 V vs. Li$^0$) |
| 6 | Li$_{1+x}$Mn$_{2-x}$O$_4$ (3.9-4.2 V vs. Li$^0$) [$0 \leq x \leq 0.30$] | LiMn$_{1-x''-y''}$Ni$_{x''}$Co$_{y''}$O$_2$ With or without excess lithium (3.7-4.8 V vs. Li$^0$) [$0 \leq x'' \leq 1; 0 \leq y'' \leq 1; 0 \leq x'' + y'' \leq 1$] | 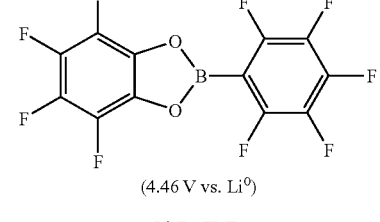 (4.46 V vs. Li$^0$) |
| 7 | Li$_{1+x}$Mn$_{2-x}$O$_4$ (3.9-4.2 V vs. Li$^0$) [$0 \leq x \leq 0.30$] | LiCoO$_2$ (3.95-4.7 V vs. Li$^0$) | Li$_2$B$_{12}$H$_3$F$_9$ (4.54 V vs. Li$^0$) |

TABLE 1-continued

Examples of Primary/Secondary positive material and redox shuttle pairs

| No. | Primary positive material | Secondary positive material | Redox shuttle |
|---|---|---|---|
| 8 | $Li_{1+x}Mn_{2-x}O_4$ (3.9-4.2 V vs. $Li^0$) [$0 \leq x \leq 0.30$] | $LiMn_{1-x''-y''}Ni_{x''}Co_{y''}O_2$ With or without excess lithium (3.7-4.8 V vs. $Li^0$) [$0 \leq x'' \leq 1; 0 \leq y'' \leq 1; 0 \leq x'' + y'' \leq 1$] | $Li_2B_{12}H_3F_9$ (4.54 V vs. $Li^0$) |
| 9 | | $LiCoO_2$ (3.95-4.7 V vs. $Li^0$) | 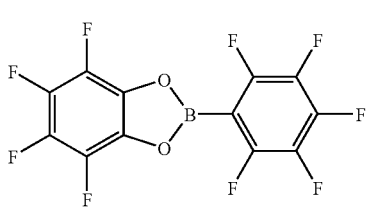 [SMILES: Fc1c(F)c(F)c(B2Oc3c(F)c(F)c(F)c(F)c3O2)c(F)c1F] (4.46 V vs. $Li^0$) |
| 10 | | $LiCoO_2$ (3.95-4.7 V vs. $Li^0$) | $Li_2B_{12}H_3F_9$ (4.54 V vs. $Li^0$) |
| 11 | | $LiMn_{1-x''-y''}Ni_{x''}Co_{y''}O_2$ With or without excess lithium (3.7-4.8 V vs. $Li^0$) [$0 \leq x'' \leq 1; 0 \leq y'' \leq 1; 0 \leq x'' + y'' \leq 1$] | 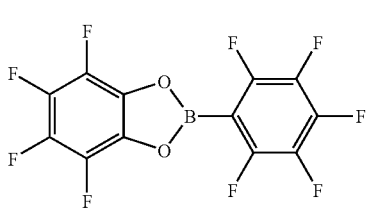 [SMILES: Fc1c(F)c(F)c(B2Oc3c(F)c(F)c(F)c(F)c3O2)c(F)c1F] (4.46 vs. $Li^0$) |
| 12 | | $LiMn_{1-x''-y''}Ni_{x''}Co_{y''}O_2$ With or without excess lithium (3.7-4.8 V vs. $Li^0$) [$0 \leq x'' \leq 1; 0 \leq y'' \leq 1; 0 \leq x'' + y'' \leq 1$] | $Li_2B_{12}H_3F_9$ (4.54 V vs. $Li^0$) |

As demonstrated herein, the charge buffer significantly enhances the pulse overcharge protection capability of the redox shuttle. For instance, 2,5-di-(tert-butyl)-1,4-dimethoxybenzene has a redox potential of 3.9 V vs. $Li^0$ and is a stable redox shuttle for $LiFePO_4$ positive electrodes, which have a working potential of about 3.5 V vs. $Li^0$. Spinel, which delivers capacity at 4.0-4.2 V vs. $Li^0$, may be used as the charge buffer for $LiFePO_4$ and may dramatically boost the pulse overcharge protection capability of 2,5-di-(tert-butyl)-1,4-dimethoxybenzene. Successful charge buffers are not limited to spinel materials. Any positive electrode material that delivers capacity at potentials higher than 3.9V vs. Li (e.g. $LiCoO_2$, $LiCo_{1-\alpha'}Al_{\alpha'}O_2$, $LiMn_{1-x''-y''}Ni_{x''}Co_{y''}O_2$, etc., wherein $0 \leq \alpha' \leq 0.2, 0 \leq x'' \leq 1, 0 \leq y'' \leq 1, 0 \leq x''+y'' \leq 1$) can be an excellent charge buffers for batteries incorporating 2,5-di-(tert-butyl)-1,4-dimethoxybenzene, as the redox shuttle.

Another example of a redox shuttle for 4V class positive electrode materials is (tetrafluorobenzo-1,2-dioxyl)pentafluorophenylborane. This redox shuttle has a redox potential of about 4.4 V vs. $Li^0$, and is suitable to protect 4 V class positive electrodes from overcharging. In this example, materials that deliver capacity above 4.4 V vs. $Li^0$ may be used as a charge buffer. In one instance, the charge buffer may be $Li_{1+\alpha'}(MnNiCo)_{(1-\alpha')/3}O_2$, which can deliver capacity up to 4.6 V vs. $Li^0$; $0 \leq \alpha' \leq 0.2$.

In some embodiments, the positive electrode is a blend of two or more different positive electrode materials. At least one of the materials is the primary material that works properly below the redox potential of the redox shuttle, and at least one of the materials is added as the charge buffer. In certain cases, positive electrode materials can act as both the primary material and as the charge buffer, particularly in cases where the material exhibits different voltage potentials at zero charge and at full charge. In some embodiments the positive material is $LiMn_{1-x''-y''}Ni_{x''}Co_{y''}O_2$, wherein $0 \leq x'' \leq 1$, $0 \leq y'' \leq 1$, $0 \leq x''+y'' \leq 1$. For instance, $LiMn_{1/3}Ni_{1/3}Co_{1/3}O_2$ with 10% excess lithium delivers capacity in a wide potential range from about 3.7 V to about 4.6 V vs. Li. Therefore, any positive electrodes containing materials such as $LiMn_{1/3}Ni_{1/3}Co_{1/3}O_2$ with 10% excess lithium may fulfill the design described in the present invention.

In some embodiments, the device is an electrochemical device such as a lithium secondary battery. The battery may comprise a primary positive material of a lithium metal oxide or a mixture of two or more lithium metal oxides; a secondary positive material of a lithium metal oxide or a mixture of two or more lithium metal oxides different from the primary positive material; an anode of graphite, amorphous carbon, $Li_4Ti_5O_{12}$, tin alloys, silicon alloys, intermetallic compounds, lithium metal, or mixtures of any two or more thereof; where the anode and cathode are separated from each other by a porous separator; and an electrolyte comprising an alkali metal salt, a polar aprotic solvent, and a redox shuttle additive.

Suitable porous separators may be made from materials well known to those skilled in the art. Typically, the porous separator comprises polypropylene, polyethylene, or a multilayer laminate of polypropylene and polyethylene.

In another embodiment, an electrochemical device may comprise: a cathode comprising at least one primary positive material such as LiFePO$_4$; and at least one secondary positive material such as spinel, LiMn$_2$O$_4$, LiCoO$_2$, LiCo$_{1-\alpha'}$Al$_{\alpha'}$O$_2$, or LiMn$_{1-x''-y''}$Ni$_{x''}$Co$_{y''}$O$_2$, wherein $0 \leq \alpha' \leq 0.2$; $0 \leq x'' \leq 1$, $0 \leq y'' \leq 1$, $0 \leq x''+y'' \leq 1$; an anode; and a non-aqueous electrolyte comprising; Li$_2$B$_{10}$X$_{10}$, Li$_2$B$_{12}$X$_{12}$, or a mixture thereof; wherein each X is independently selected from the group consisting of H, F, Cl, Br, I, OCH$_3$, and OH; a polar aprotic solvent; and a redox shuttle additive; where the redox potential of the redox shuttle additive is greater than the working potential of the primary positive material and lower than the working potential of the secondary positive material; and where the redox shuttle additive is stable at the redox potential of the secondary positive material. Alternatively, the redox shuttle additive does not decompose at the working potential of the device, or at the overcharge potential of the device.

The following terms are used throughout as defined below.

The term "decomposition" refers to the process of a material changing its chemical bonding due to electrochemical or chemical forces. For example, polymerization, degradation, chemical reaction, and isomerization would all be considered to be decomposition processes. The redox shuttle additives of the present invention are stable at the redox potential of the secondary positive material and do not decompose, or at least do not decompose to form a passivation film on either the cathode or anode.

The term "spinel" refers to manganese-based spinel such as, e.g., Li$_{1+x}$Mn$_{2-z}$Met$_y$O$_{4-m}$X$_n$, wherein Met is Al, Mg, Ti, B, Ga, Si, Ni, or Co; X is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

The term "olivine" refers to iron-based olivine such as, e.g., LiFe$_{1-z}$Met'$_y$PO$_{4-m}$X$_n$, wherein Met" is Al, Mg, Ti, B, Ga, Si, Ni, Mn or Co; X is S or F; and wherein $0 \leq x \leq 0.3$; $0 \leq y \leq 0.5$, $0 \leq z \leq 0.5$, $0 \leq m \leq 0.5$ and $0 \leq n \leq 0.5$.

Alkyl groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

Alkynyl groups are straight chain or branched alkyl groups having 2 to about 20 carbon atoms, and further including at least one triple bond. In some embodiments alkynyl groups have from 1 to 12 carbons, or, typically, from 1 to 8 carbon atoms. Exemplary alkynyl groups include, but are not limited to, ethynyl, propynyl, and butynyl groups. Alkynyl groups may be substituted similarly to alkyl groups. Divalent alkynyl groups, i.e., alkynyl groups with two points of attachment, include but are not limited to CH—C≡CH.

One skilled in the art will readily realize that all ranges discussed can and do necessarily also describe all subranges therein for all purposes, and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Example 1

FIG. 1 shows the differential capacity profile of a half-cell comprising a LiFePO$_4$/LiMn$_2$O$_4$ blended positive electrode. The electrolyte used is 1.2 M LiPF$_6$ in EC/PC/DMC (1:1:3 by weight). Notice that the figure in the right panel was blown up by a factor of 250. Clearly, the LiFePO$_4$ delivers the bulk capacity at about 3.5 V vs. Li$^0$, and the redox shuttle additive, 2,5-di-(tert-butyl)-1,4-dimethoxybenzene, delivers charge capacity at about 3.9 V. The profile shown in the right panel is differential capacity of LiMn$_2$O$_4$, which acts as the charge buffer in this example.

Example 2

Figure 2:
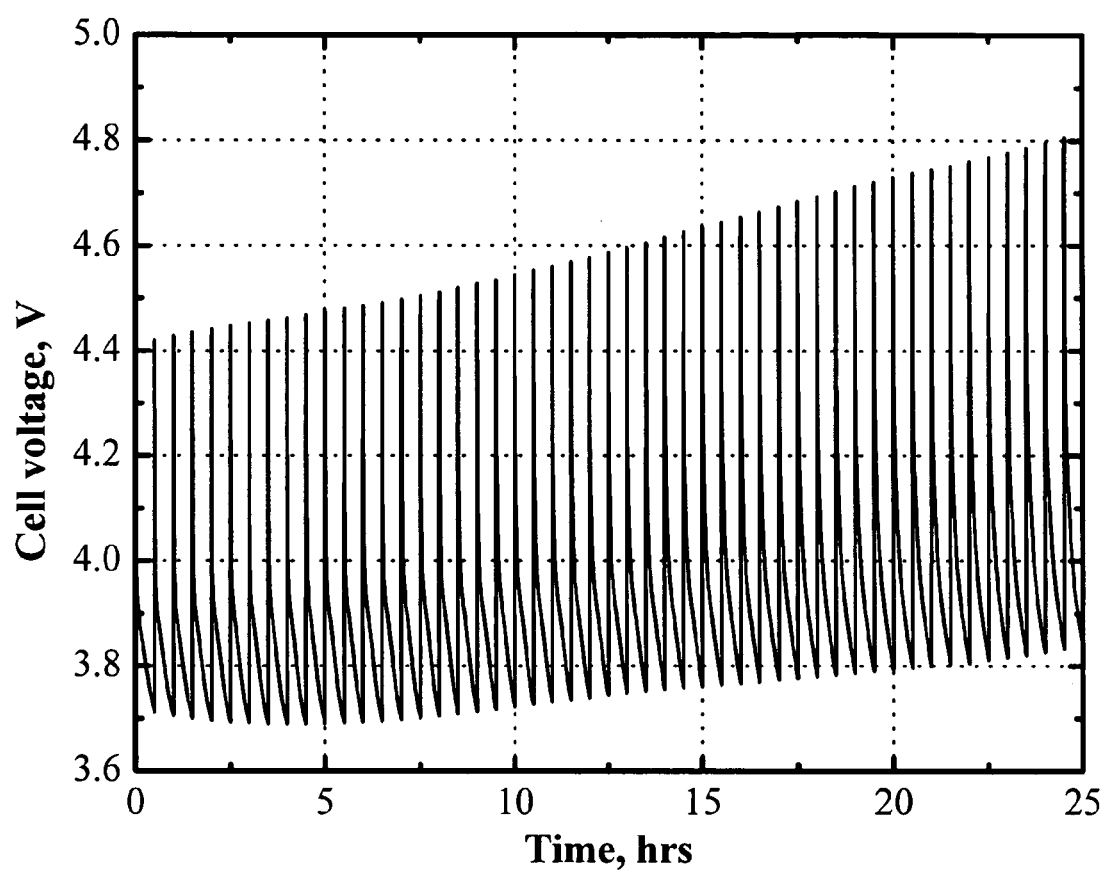
FIG. 2 is a graph of cell voltage v. time indicating pulse overcharge characteristics of a $MCMB/LiFePO_4$ cell, where MCMB is an abbreviation for mesocarbon microbeads. The cell was pulse-overcharged at a 3 C rate for 18 seconds, every 30 minutes. The electrolyte used was 0.7M $Li[B(C_2O_4)_2]$ (LiBOB) in EC/PC/DMC (1:1:3 by weight) with 1.5 wt % 2,5-di-(tert-butyl)-1,4-dimethoxybenzene.

FIG. 2 shows the cell voltage of a MCMB/LiFePO$_4$ cell that is pulse-overcharged. The electrolyte used is 0.7 M LiBOB in EC/PC/DMC (1:1:3 by weight) with 1.5 wt % 2,5-di-(tert-butyl)-1,4-dimethoxybenzene added as a redox shuttle additive. The cell was pulse-overcharged at a 3 C rate for 18 seconds every 30 minutes. FIG. 2 clearly shows that the addition of the redox shuttle additive to the electrolyte does not prevent increasing cell voltage during the pulse-overcharge at a 3 C rate. The cell voltage at the end of the pulse-overcharge rapidly increases with the pulse number.

Example 3

Figure 3:
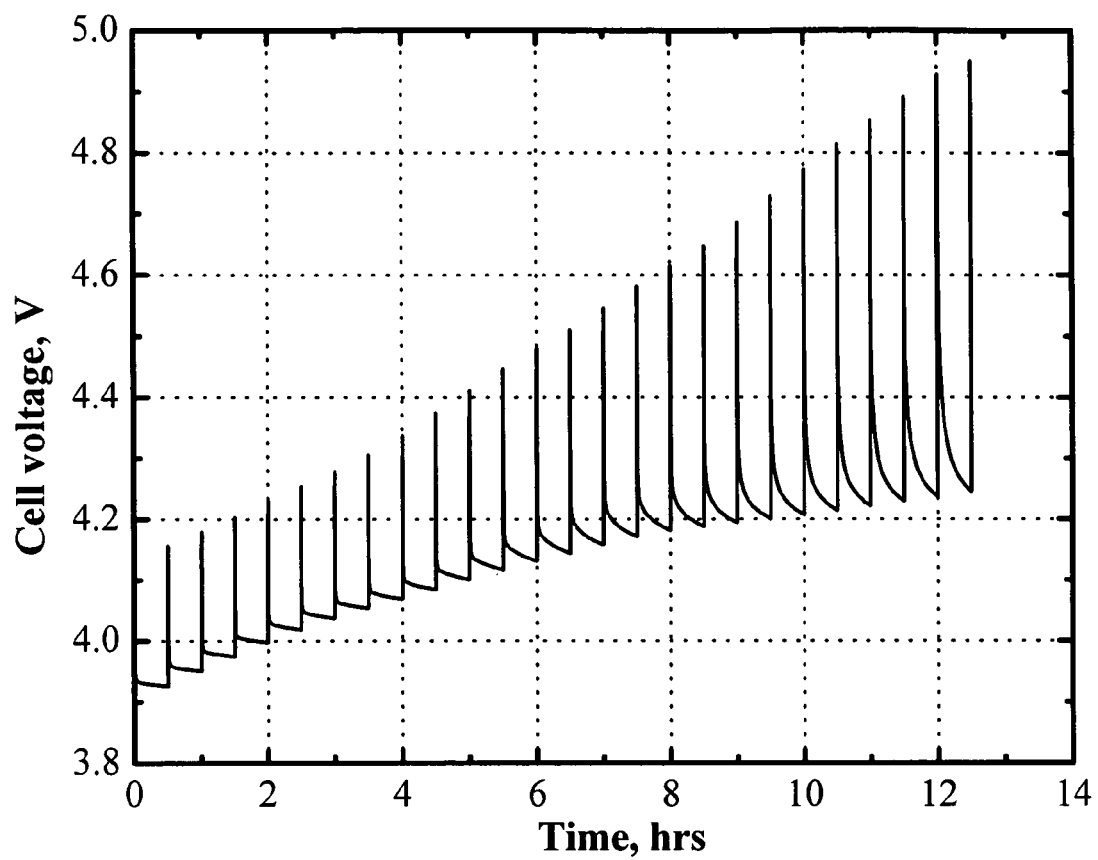
FIG. 3 is a graph of cell voltage v. time indicating pulse overcharge characteristics of a $MCMB/LiFePO_4$ and $LiMn_2O_4$ cell. The cell was pulse-overcharged at a 3 C rate for 18 seconds, every 30 minutes. The electrolyte used was 0.7M LiBOB in EC/PC/DMC (1:1:3 by weight) without any redox shuttle additive.

FIG. 3 shows the cell voltage of a MCMB/LiFePO$_4$ and LiMn$_2$O$_4$ cell that is pulse-overcharged. The electrolyte used is 0.7 M LiBOB in EC/PC/DMC (1:1:3 by weight) without any redox shuttle additive. The cell was pulse-overcharged at a 2 C rate for 18 seconds every 30 minutes. The cell did not survive the 2 C pulse-overcharging as shown by the accumulation of charge on the positive electrode during overcharge. The charge accumulation occurs despite the presence of the LiMn$_2$O$_4$ charge buffer.

Example 4

Figure 4:
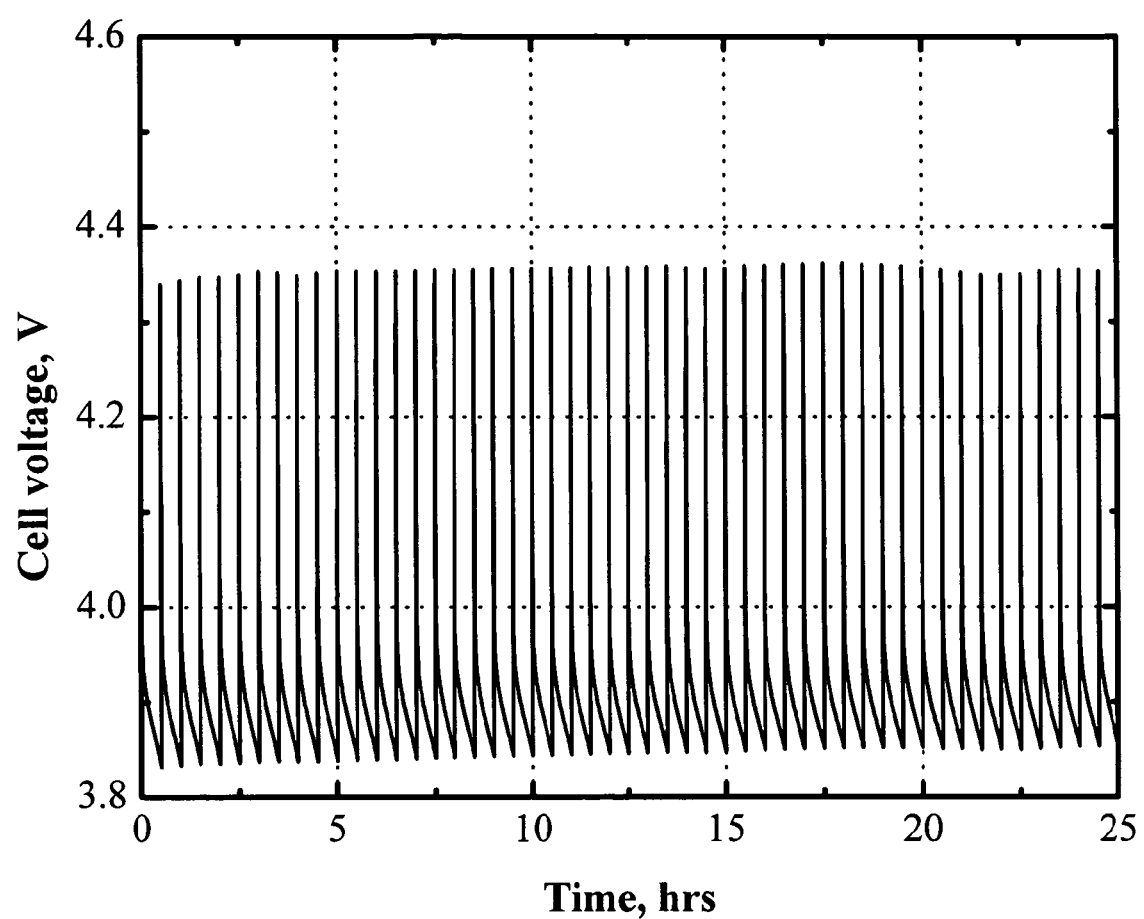
FIG. 4 is a graph of cell voltage v. time indicating pulse overcharge charge tolerance of a $MCMB/LiFePO_4$ and $LiMn_2O_4$ cell showing the significant impact of bulk/buffer design. The cell was pulse-overcharged at a 4 C rate for 18 seconds, every 30 minutes. The electrolyte used was 0.7M LiBOB in EC/PC/DMC (1:1:3 by weight) with 1.5 wt % 2,5-di-(tert-butyl)-1,4-dimethoxybenzene.

FIG. 4 shows the cell voltage of a cell comprising a blended electrode of MCMB/LiFePO$_4$ and LiMn$_2$O$_4$ cell during pulse-overcharge to demonstrate the dramatic impact of bulk/buffer design on the pulse-overcharge tolerance. The positive electrode used is a blend of LiFePO$_4$ and LiMn$_2$O$_4$ with a ratio of 9:1 by weight. The differential capacity profile of the positive electrode is shown in FIG. 1. The electrolyte used is 0.7 M LiBOB in EC/PC/DMC (1:1:3 by weight) with 1.5 wt % 2,5-di-(tert-butyl)-1,4-dimethoxybenzene. The cell was pulse overcharged with a 4 C rate for 18 seconds every 30 minutes. The maximum cell voltage during the overcharge pulse remained under 4.4 V. No increase in cell voltage was observed with increasing pulse number.

We claim:

1. An electrochemical device comprising:
    a cathode comprising at least one primary positive material and at least one secondary positive material;
    an anode; and
    a non-aqueous electrolyte comprising a redox shuttle additive;
    wherein
        the redox potential of the redox shuttle additive is greater than the redox potential of the primary positive material;
        the redox potential of the redox shuttle additive is lower than the redox potential of the secondary positive material; and
        the redox shuttle additive is stable at least up to the redox potential of the secondary positive material.

2. The electrochemical device of claim 1, wherein the primary positive material is a lithium metal oxide or a mixture of two or more lithium metal oxides, and the secondary positive material is a lithium metal oxide or a mixture of two or more lithium metal oxides.

3. The electrochemical device of claim 1, wherein the primary positive material is selected from the group consisting of: Li$_2$S, spinel, olivine, carbon-coated olivine, LiFePO$_4$, LiCoO$_2$, LiNiO$_2$, LiNi$_{1-x}$Co$_y$Met$_z$O$_2$, LiMn$_{0.5}$Ni$_{0.5}$O$_2$, LiMn$_{0.3}$Co$_{0.3}$Ni$_{0.3}$O$_2$, LiMn$_2$O$_4$, LiFeO$_2$, LiMet$_{0.5}$Mn$_{1.5}$O$_4$, Li$_{1+x}$Mn$_{2-x}$O$_4$, Li$_{1+x}$Ni$_\alpha$Mn$_\beta$Co$_\gamma$Met'$_\delta$O$_{2-z'}$Y'$_{z'}$, A$_n$B'$_2$(XO$_4$)$_3$, and mixtures of any two or more thereof, wherein Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B' is Ti, V, Cr, Fe, or Zr; X is P, S, Si, W, or Mo; Y' is F or S; and further wherein $0 \leq x \leq 0.3$, $0 \leq y \leq 0.5$, $0 \leq z \leq 0.5$; $0 \leq x' \leq 0.5$; $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$; and $0 \leq n' \leq 3$.

4. The electrochemical device of claim 1, wherein the primary positive is selected from the group consisting of: spinel, olivine, carbon-coated olivine, Li$_{1+x}$Mn$_{2-x}$Met$_y$O$_{4-m}$X$_n$, LiFe$_{1-z}$Met''$_y$PO$_{4-m}$X$_n$, and mixtures of any two or more thereof, wherein Met is Al, Mg, Ti, B, Ga, Si, Ni, or Co; Met'' is Al, Mg, Ti, B, Ga, Si, Ni, Mn or Co; X is S or F; $0 \leq x \leq 0.3$, $0 \leq y \leq 0.5$, $0 \leq z \leq 0.5$, $0 \leq m \leq 0.5$, and $0 \leq n \leq 0.5$.

5. The electrochemical device of claim 1, wherein the primary positive electrode material may be further stabilized by surface coating the particles of the spinel or olivine with a metal oxide selected from the group consisting of: ZrO$_2$, TiO$_2$, ZnO$_2$, WO$_3$, Al$_2$O$_3$, MgO, SiO$_2$, SnO$_2$, AlPO$_4$, Al(OH)$_3$, and mixtures of any two or more thereof.

6. The electrochemical device of claim 1, wherein the secondary positive material is selected from the group consisting of: spinel, olivine, carbon-coated olivine, LiFePO$_4$, LiCoO$_2$, LiNiO$_2$, LiNi$_{1-x}$Co$_y$Met$_z$O$_2$, LiMn$_{0.5}$Ni$_{0.5}$O$_2$, LiMn$_{0.3}$Co$_{0.3}$Ni$_{0.3}$O$_2$, LiMn$_2$O$_4$, LiFeO$_2$, LiMet$_{0.5}$Mn$_{1.5}$O$_4$, Li$_{1+x}$Ni$_\alpha$Mn$_\beta$Co$_\gamma$Met'$_\delta$O$_{2-z'}$Y'$_{z'}$, A$_n$B'$_2$(XO$_4$)$_3$, Li$_{1+x}$Mn$_{2-x}$O$_4$, LiMn$_{1-x''-y''}$Ni$_{x''}$Co$_{y''}$O$_2$, and mixtures of any two or more thereof, wherein Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, are Zn; B' is Ti, V, Cr, Fe, or Zr; X is P, S, Si, W, or Mo; Y' is F or S; and further wherein $0 \leq x \leq 0.3$, $0 \leq y \leq 0.5$, $0 \leq z \leq 0.5$; $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$; $0 \leq n' \leq 3$; and $0 \leq x'' \leq 1$, $0 \leq y'' \leq 1$, and $0 \leq x'' + y'' \leq 1$.

7. The electrochemical device of claim 1, wherein the secondary positive material is selected from the group consisting of: spinel, olivine, carbon-coated olivine, Li$_{1+x}$Mn$_{2-z}$Met$_y$O$_{4-m}$X$_n$, LiFe$_{1-z}$Met'$_y$PO$_{4-m}$X$_n$, and mixtures of any two or more thereof, wherein Met is Al, Mg, Ti, B, Ga, Si, Ni, or Co; Met'' is Al, Mg, Ti, B, Ga, Si, Ni, Mn or Co; X is S or F; $0 \leq x \leq 0.3$, $0 \leq y \leq 0.5$, $0 \leq z \leq 0.5$, $0 \leq m \leq 0.5$, and $0 \leq n \leq 0.5$.

8. The electrochemical device of claim 1, wherein the secondary positive electrode material may be further stabilized by surface coating the particles of the spinel or olivine with a metal oxide selected from the group consisting of: ZrO$_2$, TiO$_2$, ZnO$_2$, WO$_3$, Al$_2$O$_3$, MgO, SiO$_2$, SnO$_2$, AlPO$_4$, Al(OH)$_3$, and mixtures of any two or more thereof.

9. The electrochemical device of claim 1, wherein the redox shuttle additive is substituted or unsubstituted ferrocene, or a mixture of two or more thereof.

10. The electrochemical device of claim 1, wherein the redox shuttle additive is a substituted or unsubstituted aromatic compound.

11. The electrochemical device of claim 10, wherein the substituted aromatic compound is a compound of formula I:

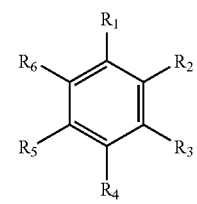

wherein
    R$_1$, R$_2$, R$_3$, R$_4$, R$_5$ and R$_6$ are each independently selected from the group consisting of H, —F, —Cl, —Br, —I, haloalkyl, cycloalkyl, alkyl, aryl, heteroaryl, —CN, —NO$_2$, —O-alkyl, —O-aryl, —O-heteroaryl, —S-alkyl, —S-aryl, —S-heteroaryl, and a moiety selected from the group consisting of:

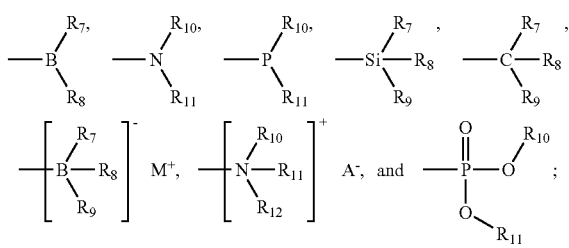

provided that at least one of $R_1$, $R_2$, $R_3$, $R_4$, $R_5$ and $R_6$ is not H; or any two adjacent groups of $R_1$, $R_2$, $R_3$, $R_4$, $R_5$ and $R_6$ together form a fused aryl or heteroaryl ring;

each $R_7$, $R_8$ and $R_9$ is independently a hydrogen, halogen, an alkyl group, an aryl group, a haloalkyl group, or a haloaryl group;

each $R_{10}$, $R_{11}$ and $R_{12}$ is independently a halogen atom, an alkyl group, an aryl group, a haloalkyl group, or a haloaryl group;

$M^+$ is a cation; and $A^-$ is an anion.

12. The electrochemical device of claim 11, wherein two or more of $R_1$, $R_2$, $R_3$, $R_4$, $R_5$ and $R_6$ are each independently an —O-alkyl, —O-aryl, or —O-heteroaryl group.

13. The electrochemical device of claim 1, wherein the redox shuttle additive is 2,5-di-(tert-butyl)-1,4-dimethoxybenzene, or a mixture of 2,5-di-(tert-butyl)-1,4-dimethoxybenzene and (tetrafluorobenzo-1,2-dioxyl)-pentafluorophenyl-borane.

14. The electrochemical device of claim 1, wherein the redox shuttle additive is $Li_2B_{10}X_{10}$ or $Li_2B_{12}X_{12}$; wherein each X is independently selected from the group consisting of H, F, Cl, Br, I, $OCH_3$, and OH.

15. The electrochemical device of claim 1, wherein the redox shuttle additive has a redox potential vs. $Li^0$ from about 3.0V to about 5.0V.

16. The electrochemical device of claim 15, wherein the redox shuttle additive is $Li_2B_{10}X_{10}$ or $Li_2B_{12}X_{12}$; wherein each X is independently selected from the group consisting of H, F, Cl, Br, I, $OCH_3$, and OH.

17. The electrochemical device of claim 1, wherein the redox shuttle additive is a mixture of two or more compounds selected from the group consisting of
substituted or unsubstituted ferrocene;
2,5-di-(tert-butyl)-1,4-dimethoxybenzene;
(tetrafluorobenzo-1,2-dioxyl)-pentafluorophenyl-borane;
$Li_2B_{10}X_{10}$ or $Li_2B_{12}X_{12}$, wherein each X is independently selected from the group consisting of H, F, Cl, Br, I, $OCH_3$, and OH; and
a compound of formula I:

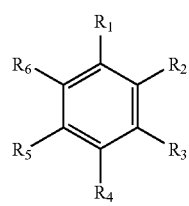

wherein:
$R_1$, $R_2$, $R_3$, $R_4$, $R_5$ and $R_6$ are each independently selected from the group consisting of H, —F, —Cl, —Br, —I, haloalkyl, cycloalkyl, alkyl, aryl, heteroaryl, —CN, —NO$_2$, —O-alkyl, —O-aryl, —O-heteroaryl, —S-alkyl, —S-aryl, —S-heteroaryl, and a moiety selected from the group consisting of:

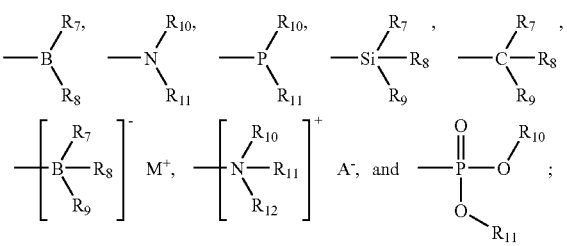

provided that at least one of $R_1$, $R_2$, $R_3$, $R_4$, $R_5$ and $R_6$ is not H; or any two adjacent groups of $R_1$, $R_2$, $R_3$, $R_4$, $R_5$ and $R_6$ together form a fused aryl or heteroaryl ring;

each $R_7$, $R_8$ and $R_9$ is independently a hydrogen, halogen, an alkyl group, an aryl group, a haloalkyl group, or a haloaryl group;

each $R_{10}$, $R_{11}$ and $R_{12}$ is independently a halogen atom, an alkyl group, an aryl group, a haloalkyl group, or a haloaryl group;

$M^+$ is a cation; and $A^-$ is an anion.

18. The electrochemical device of claim 1, wherein the electrolyte further comprises a lithium salt.

19. The electrochemical device of claim 18, wherein the lithium salt is $Li[B(C_2O_4)_2]$, $Li[BF_2(C_2O_4)]$, $Li[PF_2(C_2O_4)_2]$, $LiClO_4$, $LiBF_4$, $LiAsF_6$, $LiPF_6$, $LiCF_3SO_3$, $Li[N(CF_3SO_2)_2]$, $Li[C(CF_3SO_2)_3]$, $Li[N(SO_2C_2F_5)_2]$, lithium alkyl fluorophosphates, or a mixture of any two or more thereof.

20. The electrochemical device of claim 18, wherein the lithium salt is $Li_2B_{10}X_{10}$ or $Li_2B_{12}X_{12}$; wherein each X is independently selected from the group consisting of H, F, Cl, Br, I, $OCH_3$, and OH.

21. The electrochemical device of claim 18, wherein the lithium salt is a mixture of two or more of: $Li[B(C_2O_4)_2]$, $Li[BF_2(C_2O_4)]$, $Li[PF_2(C_2O_4)_2]$, $LiClO_4$, $LiBF_4$, $LiAsF_6$, $LiPF_6$, $LiCF_3SO_3$, $Li[N(CF_3SO_2)_2]$, $Li[C(CF_3SO_2)_3]$, $Li[N(SO_2C_2F_5)_2]$, $Li_2B_{10}X_{10}$, and $Li_2B_{12}X_{12}$; wherein each X is independently selected from the group consisting of H, F, Cl, Br, I, $OCH_3$, and OH.

22. The electrochemical device of claim 1, wherein
the electrochemical device is a lithium secondary battery;
the primary positive material is a lithium metal oxide or a mixture of two or more lithium metal oxides;
the secondary positive material is a lithium metal oxide or a mixture of two or more lithium metal oxides different from the primary positive material;
the anode is graphite, amorphous carbon, $Li_4Ti_5O_{12}$, tin alloys, silicon alloys, intermetallic compounds, lithium metal, or mixtures of any two or more thereof; and
the anode and cathode are separated from each other by a porous separator.

23. The electrochemical device of claim 22, wherein the redox shuttle additive is a mixture of two or more compounds selected from the group consisting of:
substituted or unsubstituted ferrocene;
2,5-di-(tert-butyl)-1,4-dimethoxybenzene;
(tetrafluorobenzo-1,2-dioxyl)-pentafluorophenyl-borane;
$Li_2B_{10}X_{10}$ or $Li_2B_{12}X_{12}$, wherein each X is independently selected from the group consisting of H, F, Cl, Br, I, $OCH_3$, and OH; and a compound of formula I:

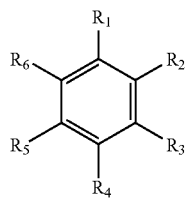

wherein:

$R_1$, $R_2$, $R_3$, $R_4$, $R_5$ and $R_6$ are each independently selected from the group consisting of H, —F, —Cl, —Br, —I, haloalkyl, cycloalkyl, alkyl, aryl, heteroaryl, —CN, —NO$_2$, —O-alkyl, —O-aryl, —O-heteroaryl, —S-alkyl, —S-aryl, —S-heteroaryl, and a moiety selected from the group consisting of:

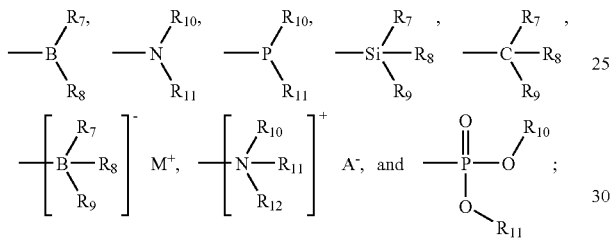

provided that at least one of $R_1$, $R_2$, $R_3$, $R_4$, $R_5$ and $R_6$ is not H; or any two adjacent groups of $R_1$, $R_2$, $R_3$, $R_4$, $R_5$ and $R_6$ together form a fused aryl or heteroaryl ring;

each $R_7$, $R_8$ and $R_9$ is independently a hydrogen, halogen, an alkyl group, an aryl group, a haloalkyl group, or a haloaryl group;

each $R_{10}$, $R_{11}$ and $R_{12}$ is independently a halogen atom, an alkyl group, an aryl group, a haloalkyl group, or a haloaryl group;

$M^+$ is a cation; and $A^-$ is an anion.

24. A electrochemical device comprising:

a cathode comprising at least one primary positive material and at least one secondary positive material;

an anode; and a non-aqueous electrolyte comprising;

$Li_2B_{10}X_{10}$, $Li_2B_{12}X_{12}$, or a mixture thereof; wherein each X is independently selected from the group consisting of H, F, Cl, Br, I, OCH$_3$, and OH;

a polar aprotic solvent; and a redox shuttle additive;

wherein, the primary positive material is LiFePO$_4$;

the secondary positive material is spinel, LiMn$_2$O$_4$, LiCoO$_2$, LiCo$_{1-\alpha'}$Al$_{\alpha'}$O$_2$, or Li$_{1+x'}$Ni$_\alpha$Mn$_\beta$Co$_\gamma$Met'$_\delta$O$_{2-z}$Y'$_{z'}$, wherein Met' is Mg, Zn, Al, Ga, B, Zr, or Ti; A is Li, Ag, Cu, Na, Mn, Fe, Co, Ni, Cu, and Zn; Y' is F or S; $0 \leq \alpha' \leq 0.2$, $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$; and the redox shuttle is 2,5-di-(tert-butyl)-1,4-dimethoxybenzene.

* * * * *

UNITED STATES PATENT AND TRADEMARK OFFICE
CERTIFICATE OF CORRECTION

PATENT NO. : 8,367,253 B2
APPLICATION NO. : 11/345947
DATED : February 5, 2013
INVENTOR(S) : Zonghai Chen It is certified that error appears in the above-identified patent and that said Letters Patent is hereby corrected as shown below:

IN THE CLAIMS

In Column 13, Claim 3, Line 54, change the word "spinet" to --spinel--.

In Column 13, Claim 4, Line 67, change the phrase "$Li_{1+x}Mn_{2-x}Met_y$" to --$Li_{1+x}Mn_{2-z}Met_y$--.

In Column 14, Claim 7, Line 30, change the phrase "$Met_yO_{4-m}X_n, LiFe_{1-z}Met'_yPO_{4-m}X_n$" to --$Met_yO_{4-m}X_n, LiFe_{1-z}Met''_yPO_{4-m}X_n$--.

Signed and Sealed this
Seventh Day of May, 2013

Teresa Stanek Rea
*Acting Director of the United States Patent and Trademark Office*